United States Patent [19]

McElroy, II et al.

[11] Patent Number: 5,013,376

[45] Date of Patent: May 7, 1991

[54] PROGRAMMABLE COMPUTER CONTROLLED PIPE FUSION DEVICE

[75] Inventors: Arthur H. McElroy, II, Tulsa; Jim M. Craig, Broken Arrow, both of Okla.

[73] Assignee: McElroy Manufacturing, Inc., Tulsa, Okla.

[21] Appl. No.: 416,062

[22] Filed: Oct. 2, 1989

[51] Int. Cl.$^5$ ............................................ B65H 69/06
[52] U.S. Cl. ...................................... 156/64; 156/358; 156/359; 156/499; 156/503
[58] Field of Search ............... 156/358, 359, 499, 367, 156/64, 503

[56] References Cited

U.S. PATENT DOCUMENTS 4,640,732 2/1987 Stafford .............................. 156/358
4,642,155 2/1987 Ramsey .............................. 156/359

*Primary Examiner*—David A. Simmons
*Attorney, Agent, or Firm*—Head & Johnson

[57] ABSTRACT

A polyethylene pipe heat fusion apparatus and method wherein the temperature, time, and hydraulic pressures necessary to create an acceptable joint are controlled by a programmable computer.

15 Claims, 13 Drawing Sheets

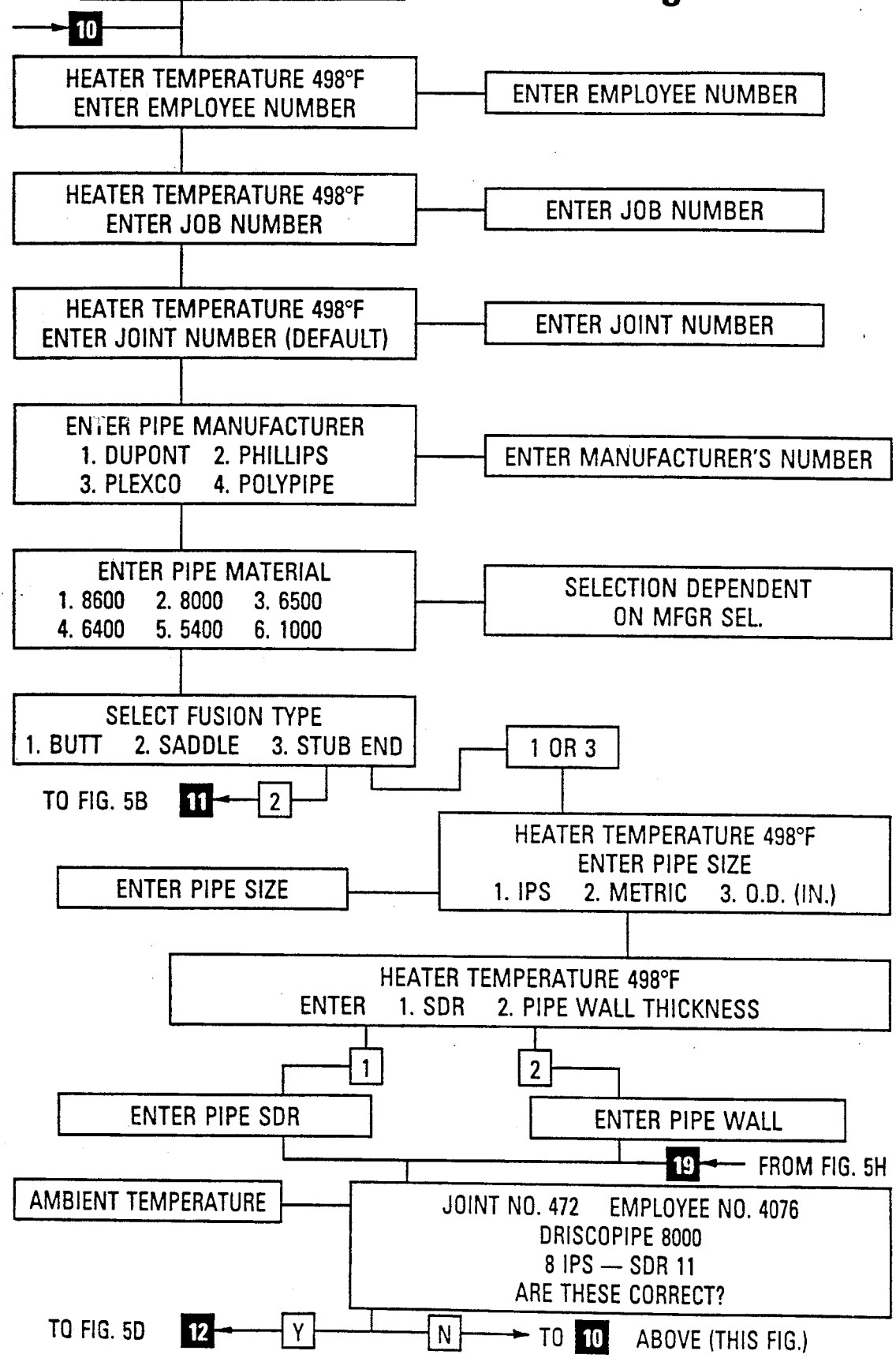

PROGRAMMABLE COMPUTER CONTROLLED PIPE FUSION DEVICE

BACKGROUND OF THE INVENTION

This invention is directed to the field of thermally joining or fusing plastic pipe and, more particularly, apparatus which is provided with means to bring two molten ends of pipe sections into fusing contact after they have been properly pretreated.

With the advance of plastic technology, there has become an ever-increasing use of thermally sensitive plastic pipe such as polyethylene in commercial and residential applications. The plastic pipe is replacing metal pipe due to the fact that it is lighter in weight and corrosion resistant. Plastic pipe may be formed in sections with one end having an upset or sleeved end with the rear or nonenlarged end of an adjacent section of pipe received therein. It is more economical, however, to connect pipe sections without the necessity of sleeved ends by heating and then fusing the pipe sections together. Various devices has been designed and patented in the past which achieved these purposes and are described and shown in U.S. Pat. Nos. 3,013,925; 3,552,265; 3,729,360; 3,846,208; and 4,352,708. These prior art devices have ranged from simple hand-operated devices to large trailer-mounted hydraulically operated apparatus. In the polyethylene pipe industry, there are now available many varying manufacturing types, sizes, and wall thicknesses of polyethylene pipe. Each of these variables plus the ambient temperature conditions at the fusion site have a direct effect upon the axial pressure or force upon the pipe ends during the time that the pipe ends are being faced, heated and fused to ensure a proper bond.

SUMMARY OF THE INVENTION

It is a primary object of this invention to provide a pipe fusion method and apparatus capable of longitudinal inline pipe joining or right angle saddle or stub-end to pipe joining in combination with a programmable computer wherein thermoplastic pipe type, size, wall thickness, ambient temperature and/or other variable factors will automatically assist the operator in obtaining fused joints that will meet desirable performance characteristics and specifications and provide a record of all joints made.

As a further object of the invention to provide a portable wheeled apparatus for fusing molten pipe sections in combination with a programmable computer that can be easily transported and used by one person.

The object of the invention and the limitations of the prior art are overcome by providing an apparatus for pretreating and heat fusion joining plastic, i.e., polyethylene, pipe sections, with a digital computer-controller. The apparatus comprises a basic frame which may or may not be a part of a wheeled vehicle. The frame includes at least one fixed pipe clamp which retains a first pipe along a defined longitudinal axis with the end within a pretreatment and heat fusion zone. A carriage defined by at least one movable pipe clamp means is axially spaced from said fixed clamp to retain a second pipe end coaxial with said first pipe end in the pretreatment and heat fusion zone. The carriage means is movably supported on guide rods wherein the guide rods are fixed to the frame means on each side of the pipe. The axis of said guide rods lie in an imaginary plane which intersects the longitudinal axis. A pipe end facing cutter and a pipe end heating means are removably received on the guide rods within the pretreatment and heat fusion zone between the first pipe end and the second pipe end. A hydraulic pressure system is provided as a coaxial part of the guide rods for the purpose of reciprocating the carriage and its clamped second pipe end from a home position toward the fixed clamp and its first pipe end and returning the carriage to its home position. A linear transducer means is provided on the carriage to indicate relative position between the carriage and the fixed pipe clamp during the various operations. A programmable digital computer is adapted to receive input data as to the pipe characteristics, including its manufacturer's type, its size, and wall thickness in addition to the information from the linear transducer and the ambient temperature condition, which then forms the computer's program parameters of data for that particular fusion operation based on that particular pipe type, size, and wall thickness. A pipe end heater means is thermostatically controlled by the programmable digital computer acting on the computer's programmed parameters. Operator input means are provided to actuate the sYstem. Based on the program parameters, the programmed digital computer controls the hydraulic pressure, carriage position, and time required to:

(1) Communicate the first and second pipe ends with a pipe end facing or cutter means to create substantially parallel pipe ends which are transverse to the longitudinal axis;

(2) Communicate the first and second pipe ends together at a low hydraulic pressure to check pipe alignment, the pipe end flatness;

(3) Communicate the first and second pipe ends at a higher hydraulic pressure to check for any slippage of the pipe in the clamps;

(4) Communicate the first and second pipe ends with the pipe end heater to form molten pipe ends; and (5) Communicate the molten first and second pipe ends together until fused and cooled while checking for slippage.

Another object of the invention is to provide a method of fusing thermoplastic, i.e., polyethylene pipe ends, utilizing a programmable digital computer which controls the operational sequences above-described as to hydraulic pressure and time for the various critical steps during the fusion process.

These other objects of the invention will become readily apparent upon further reference to the drawings, the detailed description, and claims set forth herein.

DETAILED DESCRIPTION OF THE PREFERRED EMBODIMENT

Before explaining the present invention in detail, it is to be understood that the invention is not limited in its application to the details of the construction and arrangement of parts illustrated in the accompanying drawings. The invention is capable of other embodiments and of being practiced or carried out in a variety of ways. It is to be understood that the phraseology and terminology employed herein is for the purpose of description and not of limitation.

Figure 1:
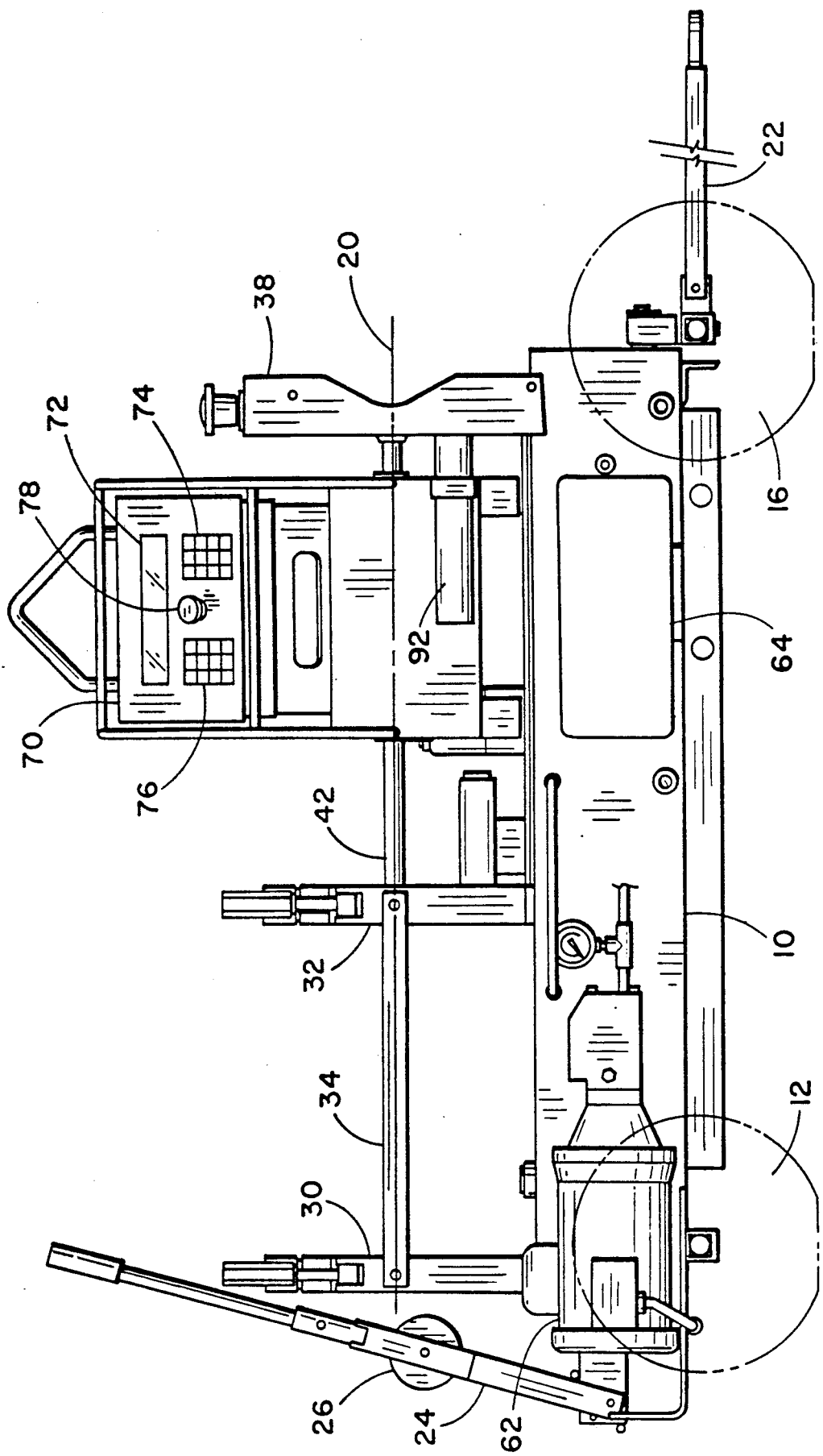
FIG. 1 is a side elevational view of the apparatus of this invention.
Figure 2:
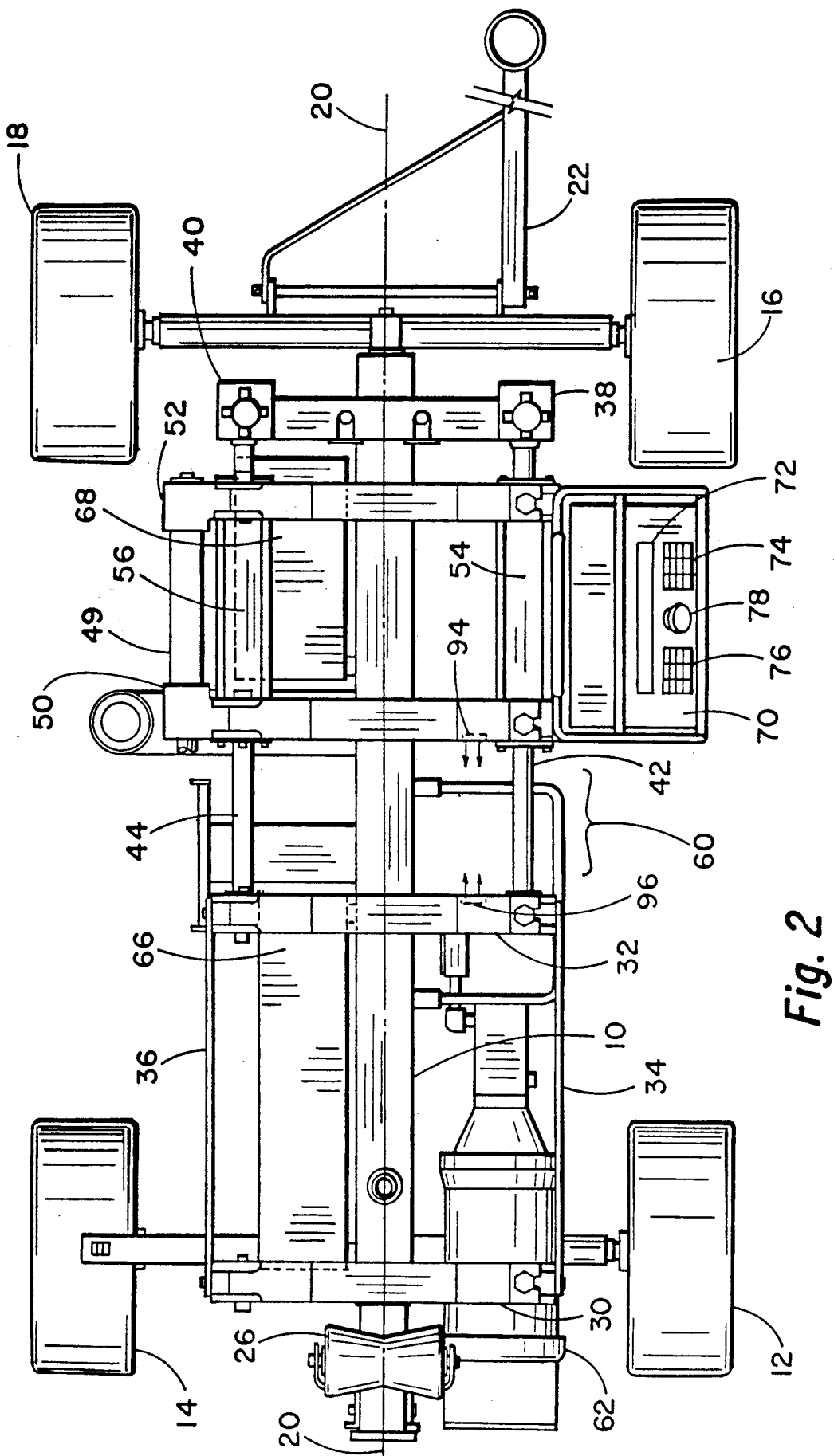
FIG. 2 is a top elevational view of the apparatus of this invention shown in FIG. 1.

Referring now to FIGS. 1 and 2, the overall apparatus of the invention is described which includes a basic structural frame 10 to which are adapted a pair of rear wheels 12 and 14 and a pair of forward wheels 16 and 18, the forward wheels being pivotal to the frame for guiding the vehicle. A longitudinal axis 20 defines the working axis of the frame and hence the axis of the pipe to be joined therein. A handlebar 22 is provided as a means of pulling the vehicle along the pipeline as it is formed by the fused joints. A pivotal handle 24 is provided at the rear of the vehicle which when pivoted and locked in a vertical position, as shown, includes an adjustable guide roller 26 for supporting the completed portion of the pipeline. Appropriate devices on the handlebar 22 can be provided for attachment to a tractor or other type of powered vehicle if desired.

Attached to the vehicle frame is the fusion assembly which comprises a plurality of fixed pipe clamps 30 and 32 which are affixed to the frame 10 and interconnected by longitudinal support bars 34 and 36. A pair of fixed tailstock pipe clamps 38 and 40 are vertically positioned at the forward end of the vehicle and comprise a pair of upright posts which are adapted to hold semi-cylindrical or V-shaped seats which define an axis transverse to the longitudinal axis 20 for retaining, by means not shown, a section of pipe transverse to the longitudinal axis for fusing saddle or other types of connections to the side of the pipe. A pair of parallel guide rods 42 and 44 are attached between the fixed clamp 32 and upright support members 38 and 40. The guide rods are positioned such that the axis of each lie in an imaginary plane which intersects the longitudinal axis 20. The moveable pipe carriage is generally designated by the numeral 49, and specifically by the pipe clamps 50 and 52 which are supported upon guide rods 42 and 44. Hydraulic actuated pressure units 54 and 56, which are incorporated as a part of the pipe carriage and the respective guide rods 42 and 44, will reciprocate the moveable pipe carriage from a 'home' position substantially as shown to an operative position toward the fixed clamp 32, with the space between the moveable carriage being defined herein as the pipe end pretreatment and heat fusion zone 60, which will be hereafter described in greater detail. Attached to the frame is an electric or internal combustion engine powered hydraulic pump unit 62, a hydraulic manifold system 64, and schematically shown an electric box 66 for a computer-controller and an electric power control box 68.

Figure 4:
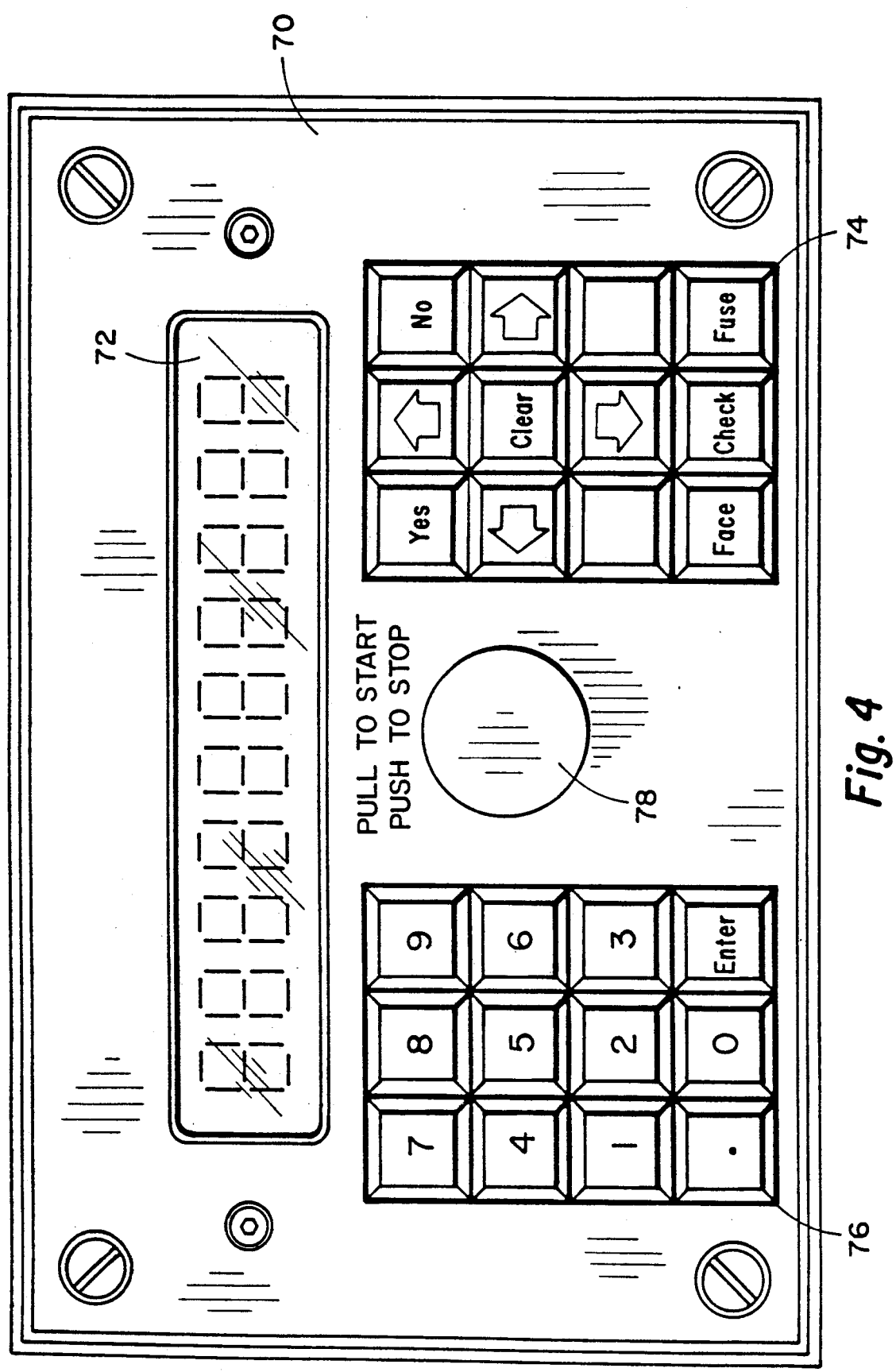
FIG. 4 is a frontal view of the programmable computer controller panel used with this invention.
Figure 5B:
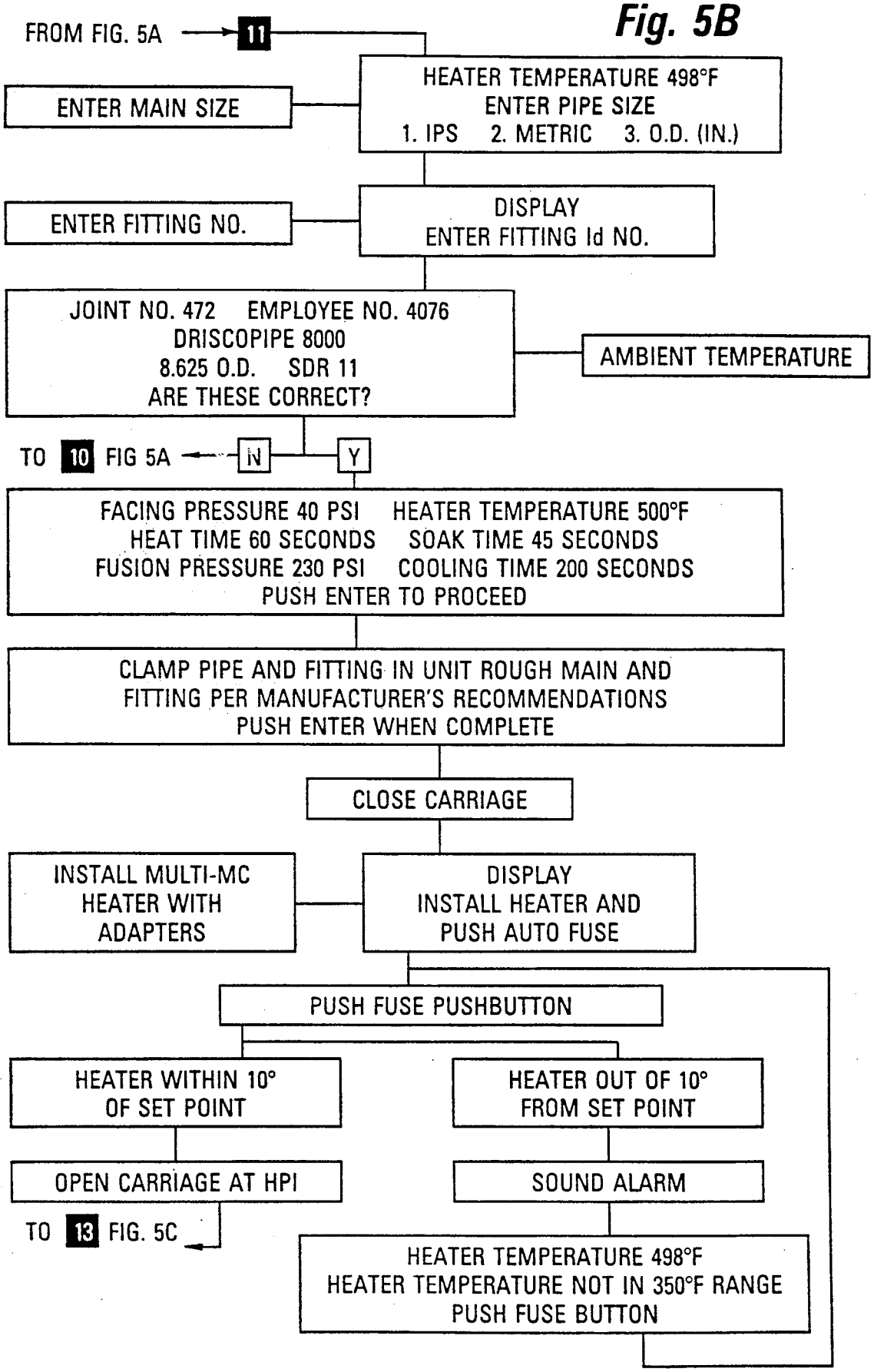
FIG. 5 is an operational flow chart integrating manual and computer program commands useful in the process of fusing pipe according to this invention.
Figure 5C:
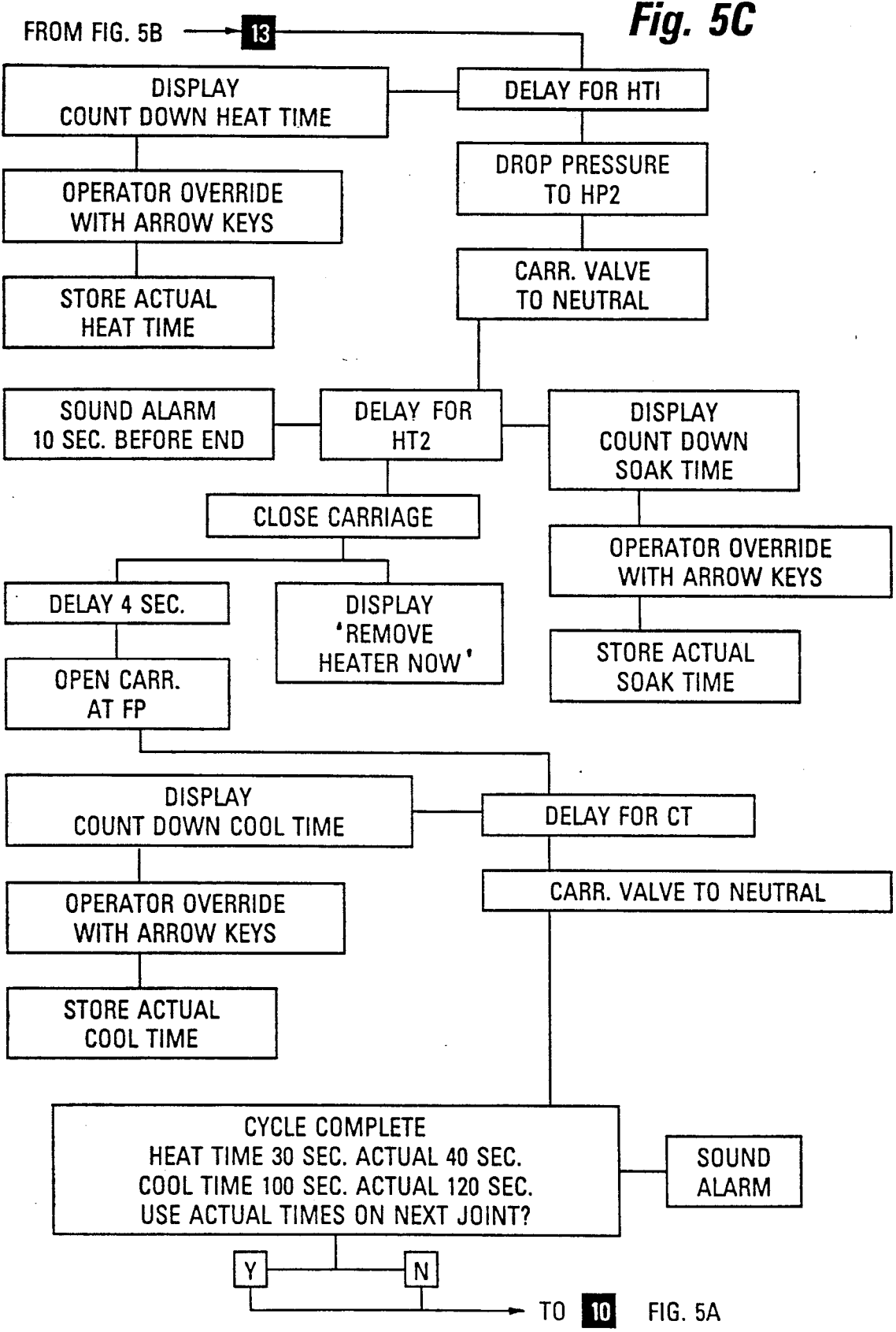
Figure 5D:
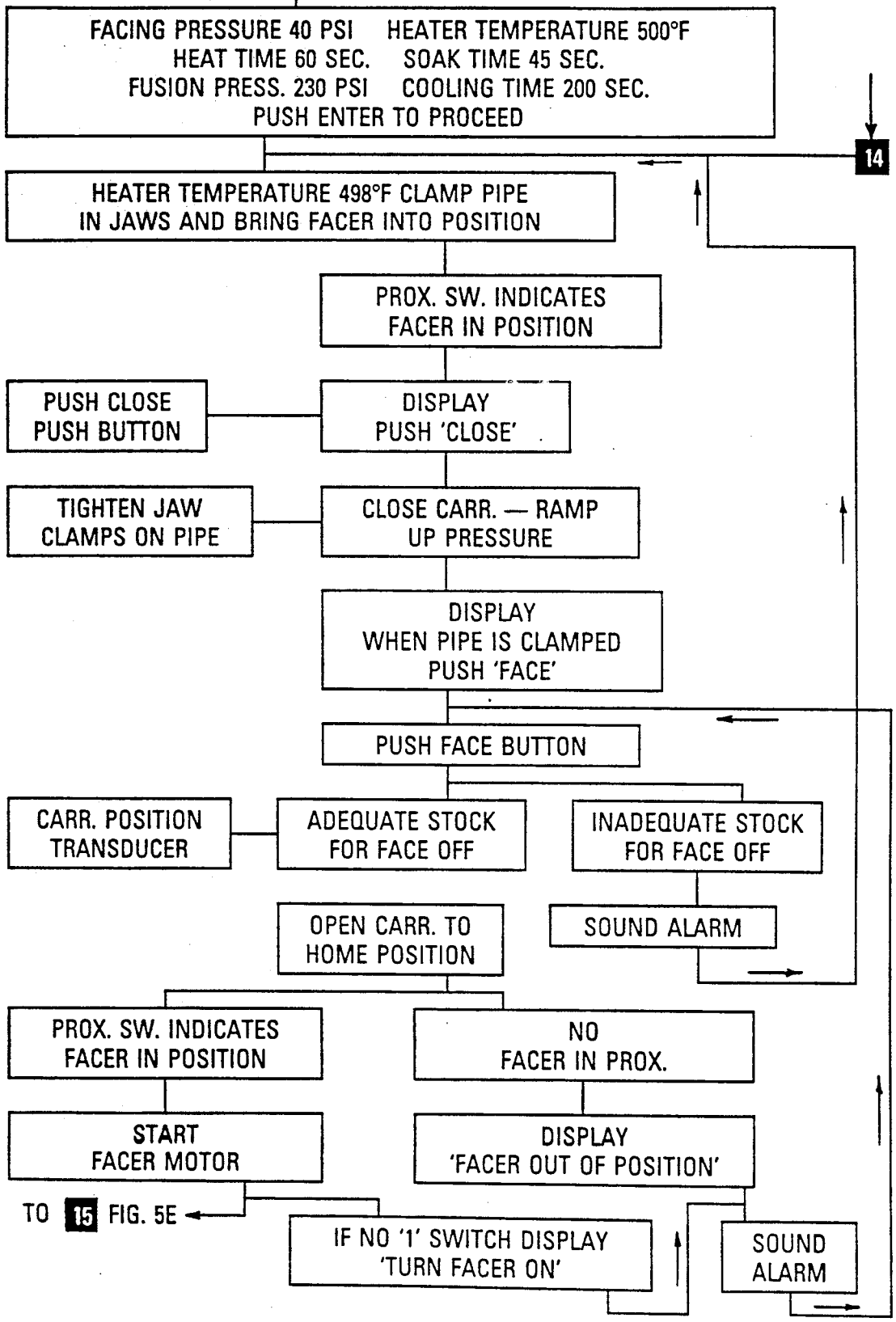
Figure 5E:
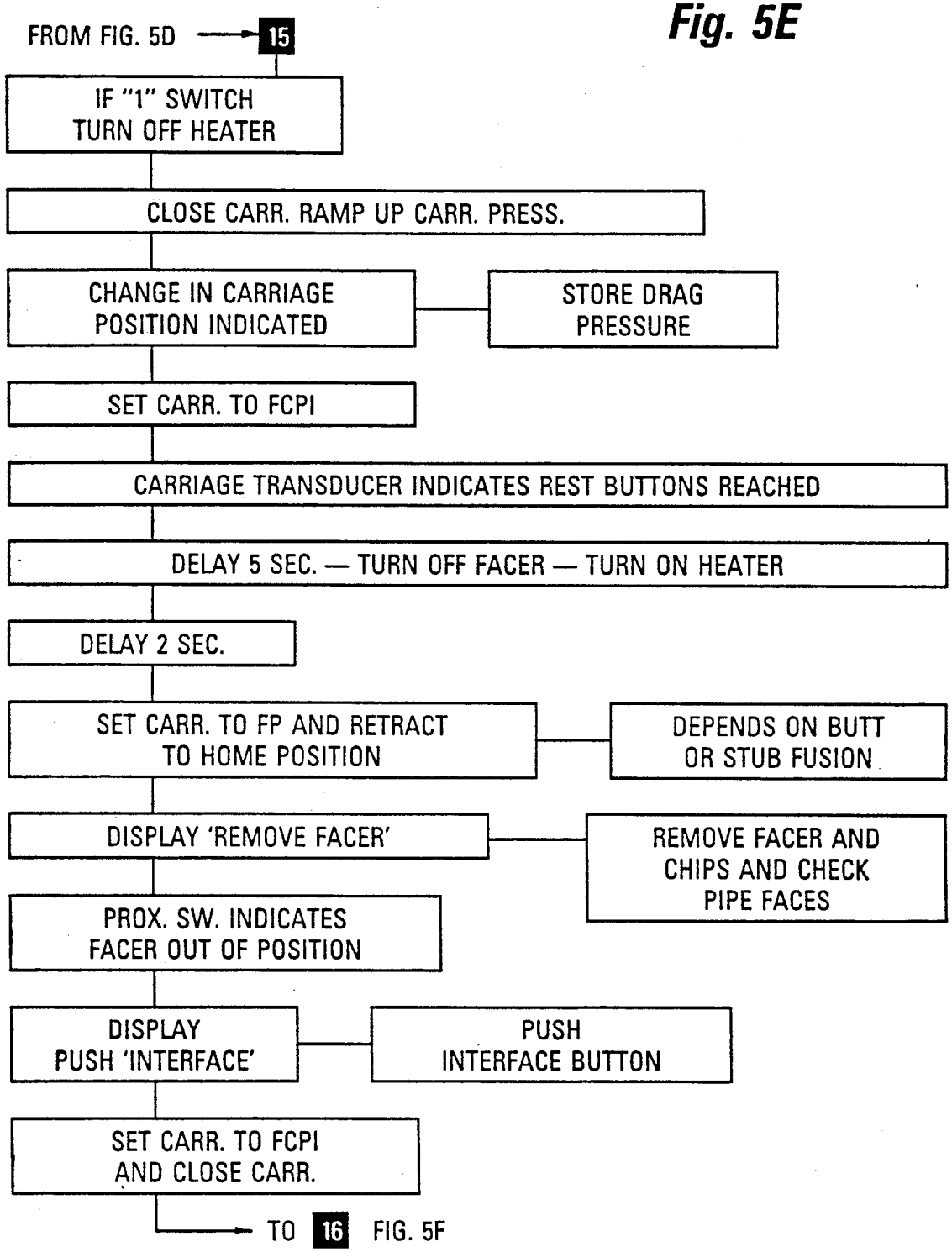
Figure 5F:
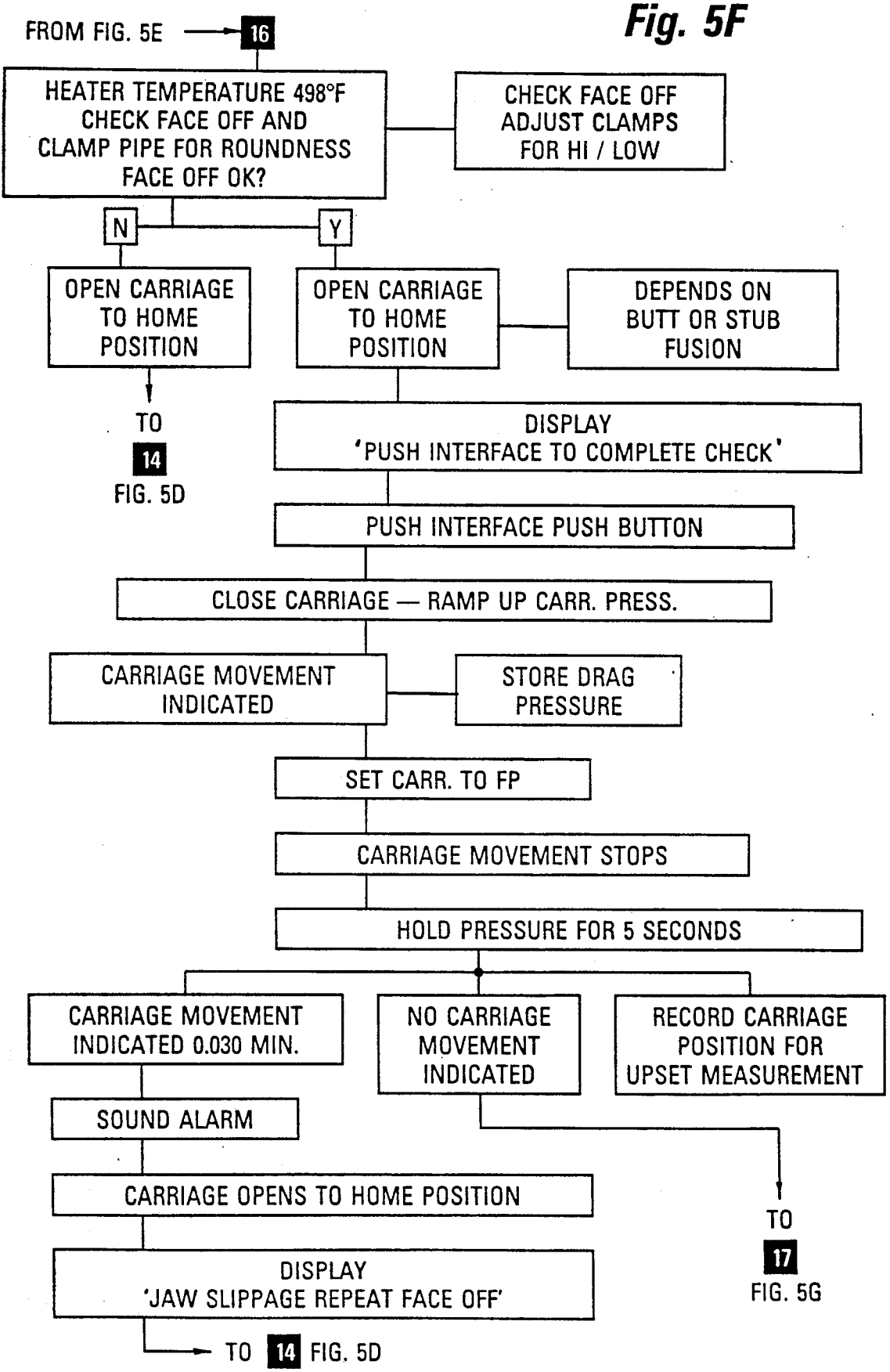
Figure 5G:
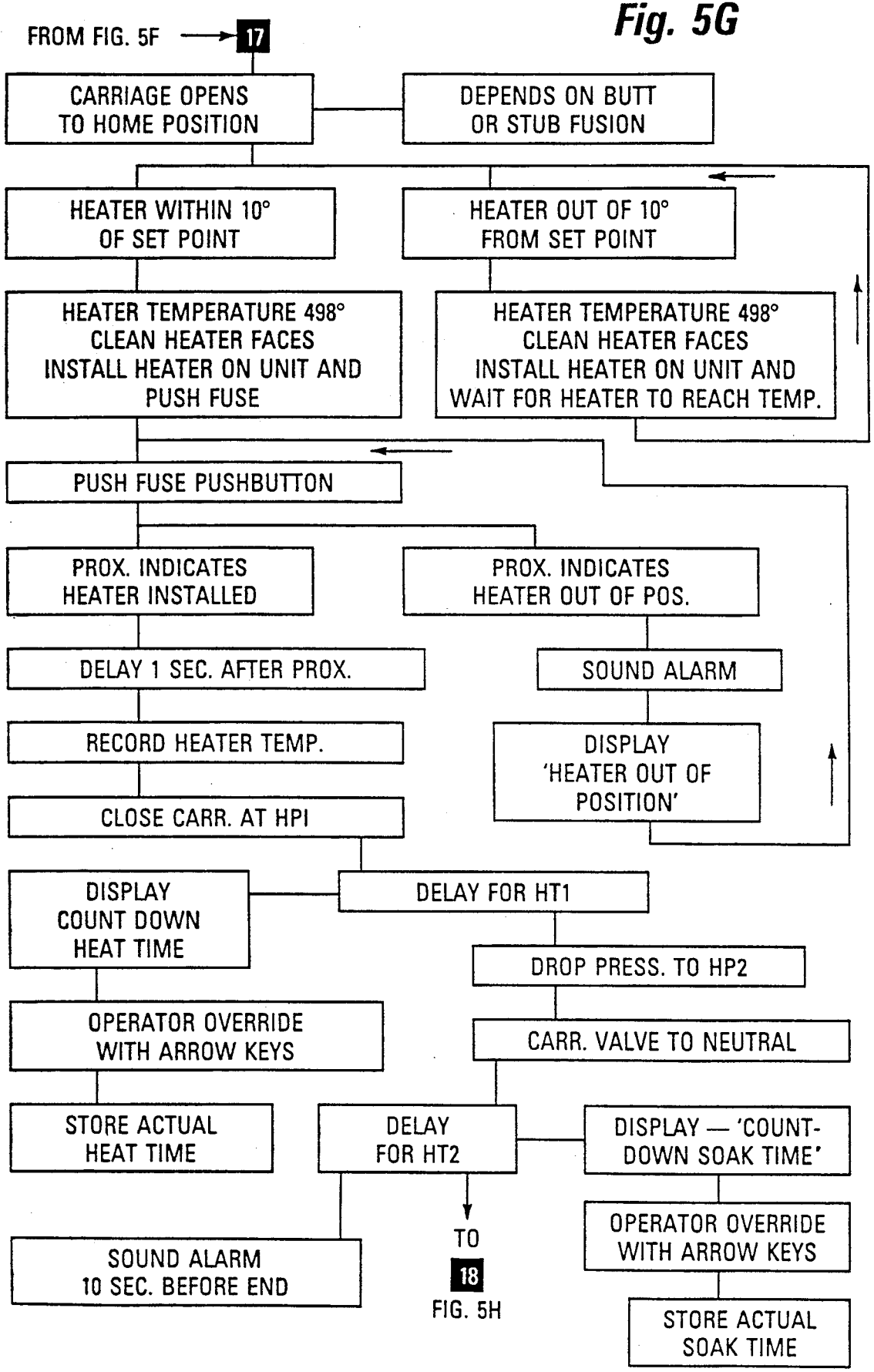
Figure 5H:
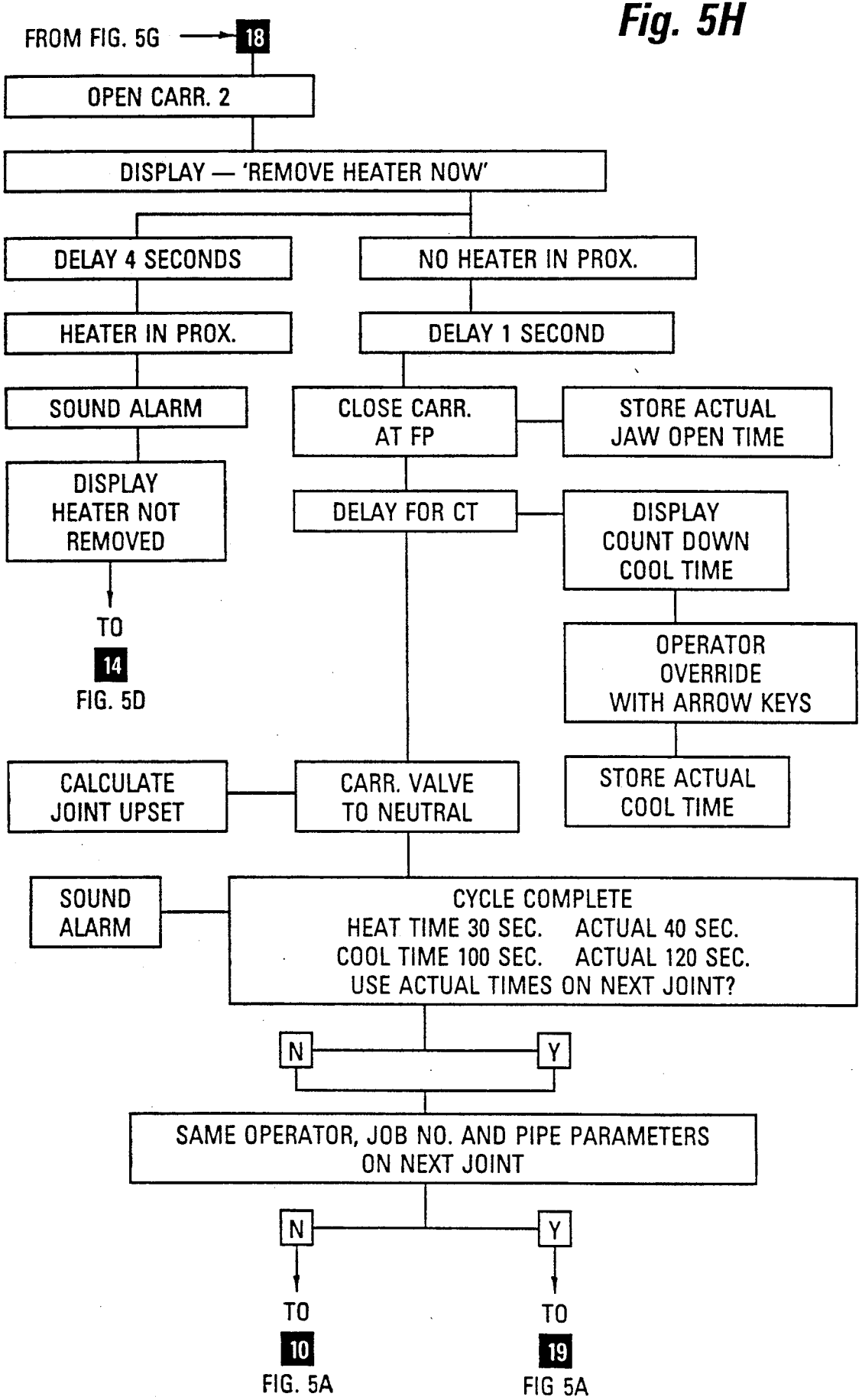
Figure 6:
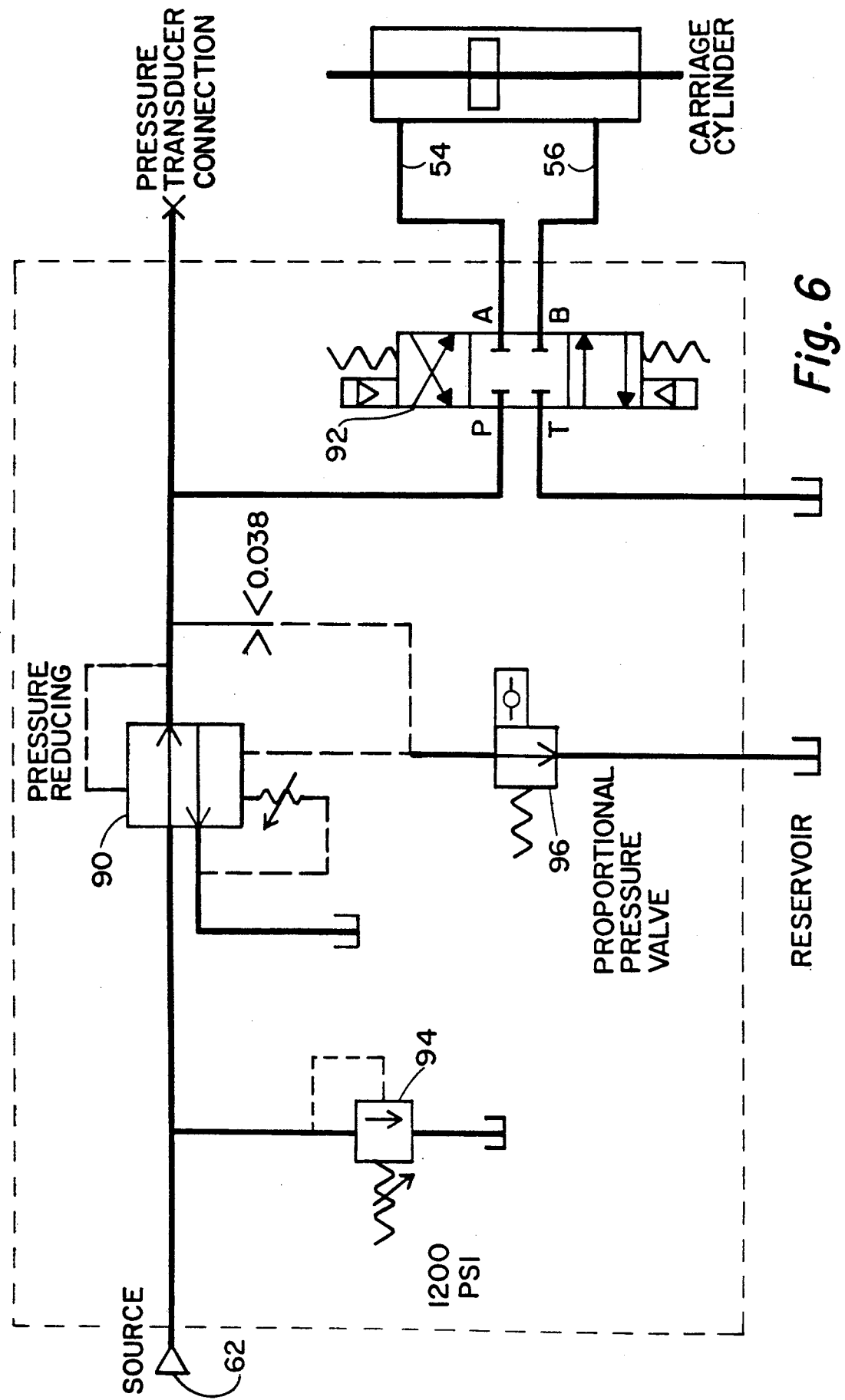
FIG. 6 is a schematic of the basic hydraulic system used in the invention.

Attached to the frame and/or to the moveable carriage means is the programmable computer control panel 70, the face of which is described in greater detail in FIG. 4. The control panel 70 includes a display 72 such as an LCD, a function keyboard 74, and a numerical keyboard 76. A start/stop switch 78 is also provided.

The fixed pipe clamps 30 and 32 and the moveable carriage pipe clamps 50 and 52 are basically the same type of overcenter clamping apparatus in which the upper portion of the clamp may be released and opened to receive the pipe which is to be fused with the next adjacent section, the concepts of which are described as, for example, in U.S. Pat. Nos. 3,729,360 and 3,846,208 which are incorporated herein by reference.

Figure 3:
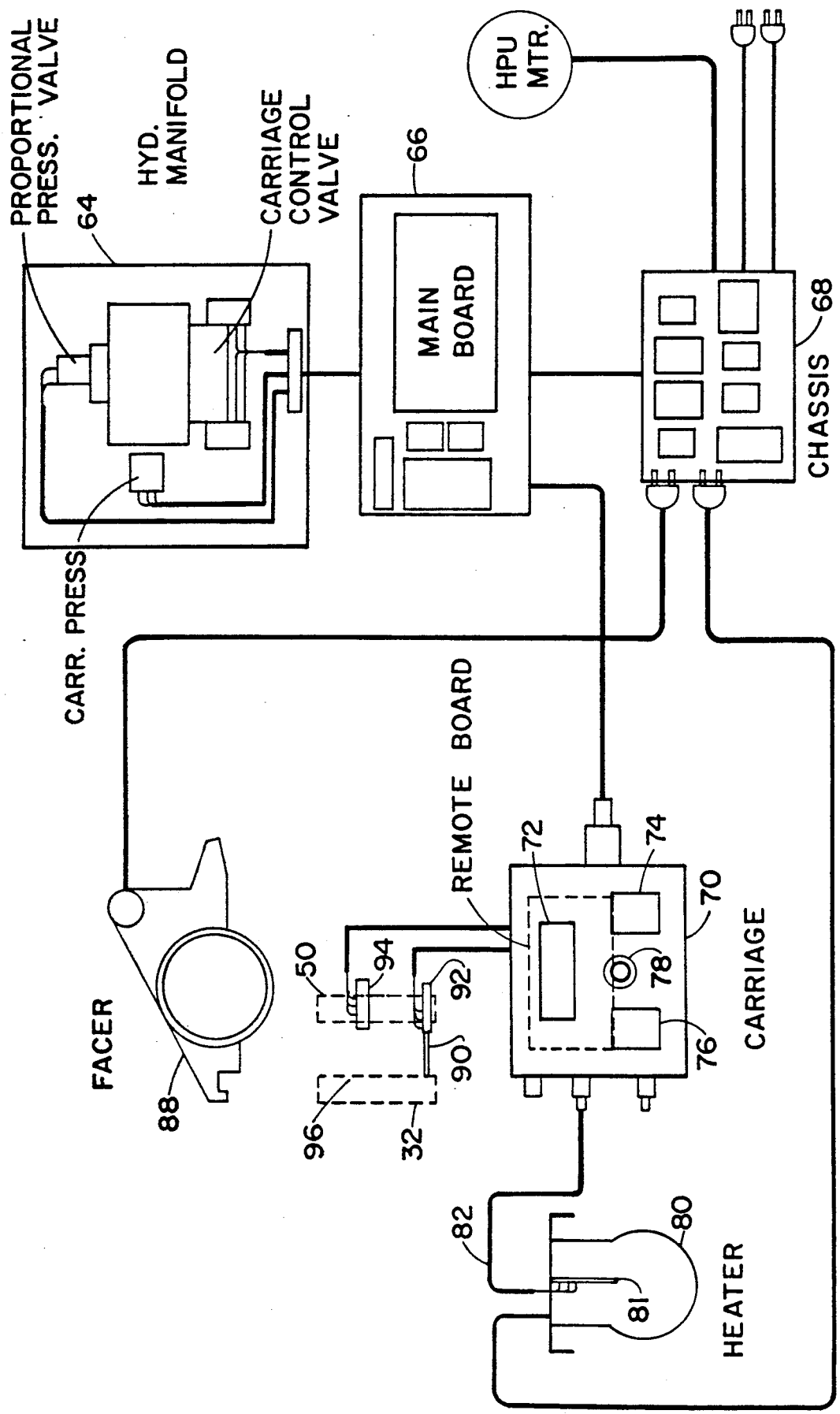
FIG. 3 is a schematic wiring diagram used with the apparatus of this invention.

FIG. 3 schematically describes a pipe end facing tool which likewise is positionable within the pretreatment operating space 60 and supported upon guide rods 42 and 44. The facing tool 88 may be hydraulically or electrically driven as shown in FIG. 3 or may include a manually operated mechanism for rotating the facing tool, the purpose of the tool being to provide parallel pipe ends which are transverse to the longitudinal axis of the pipe being fused.

As shown in FIG. 3, as a part of the pipe pretreatment process, a heater 80 is provided and is typical of that which is well known in the art such as is described in prior U.S. Pat. No. 4,227,067 and 3,846,208 which, in the preferred embodiment, includes double-sided plain-faced platens coated with a durable, anti-stick coating. A temperature sensor 81 inputs a signal to the computer which signal is compared with the program parameters to control the heater. The purpose of the heater is to precondition the pipe ends by bringing them to a molten condition for subsequent fusion. The heater is adapted to be positioned upon the guide rods 42 and 44 within the pretreatment zone 60 between the moveable carriage 49 and fixed pipe clamp 32.

An important initial procedure in the process of the invention is the calibration knowledge or position of the moveable carriage 49 relative to the fixed clamp 32. In this embodiment a longitudinal contact 90 is attached to the fixed clamp 32 as shown or it may be attached to the fixed tailstock 38 or 40 and cooperatively engaged with the linear transducer 92 that is formed as a part of the moveable carriage 49. This provides information to the programmable computer as to the carriage position relative to the fixed clamp and hence the pipe end spacing. This information is critical the during pretreatment, fusion and cooling cycles.

Electrically connected to the movable carriage 50 is a photo-cell means 94 with its axially located reflector means 96 formed within the fixed clamp 32 to indicate the presence or absence of the facer or heater within the pretreatment zone 60.

FIG. 4 is an example of the control panel as visible to the operator and comprises as heretofore described the LCD display 72, which provides operating data, operator prompting and computer menu information. The function panel 74 is to provide the operator with means to manually operate the movable carriage and to accept or reject commands, or clear the computer. The numeral panel 76 is provided to permit entry of digital information into the computer. A start/stop switch 78 is also provided. The control panel is attached to and moves with the movable carriage 49.

FIG. 7 is a hydraulic schematic typically used in the device of this invention. The hydraulic pressure unit 62 supplies high pressure hydraulic fluid through line "P" to a pressure reducing valve 90. The pressure reducing valve is controlled, via an electrical control from the computer program memory, by a proportional pressure valve 96 of the type sold under the trade name "FEMA". The purpose, of course, is that the desired pressure, for the particular cycle of operation of the fusion machine, will be provided to a directional control valve 92 which in turn operates the hydraulic carriage cylinders 54 and 56 to open the carriage to its home position or to close it during the pipe end treatment and fusion procedures. A pressure relief valve 94 is provided in the event there are excessive pressures beyond that desired.

The apparatus herein described and the methods involved for the fusion operations depend upon the manufacturer's specification. This can involve hydraulic pressures anywhere from 25 to 1,000 psi. The facing operation for butt fusion may require anywhere from 25 to 200 psi. The heating of the pipe ends may require from 25 to 600 psi while the actual fusion hydraulic pressure may range from 50 to 1,000 psi. These pressures are only by way of example.

The apparatus may include, although not shown herein, a means to down-load the data by providing means to print out a stored report of each or a multiplicity of heat fused joints. Additional information may include the particular job identification, information such as the pipe manufacturer, the pipe o.d., the ambient temperature, the pipe material, the pipe SDR or wall thickness. In addition, it may record for each fusion process the recommended and actual facing pressure, heater temperature, heating pressure, heating time and/or soak time, the fusion pressure, the cooling time, the amount of upset (displaced pipe material), and the open time of the carriage between the heat and fuse cycles. Provision is made to provide a memory wherein the stored data, such as above described, can be stored or recorded on magnetic storage means, such as a tape or disc, which can then be transmitted to a separate data processing center.

As shown in the drawings, an alarm is provided to advise the operator at the end of the heat and cool cycle, or of any inappropriate event or condition as, for example, in the event the facing cutter or the heater has not been removed, or of pipe slippage, or of extreme heater temperatures. The computer is also capable of making an automatic adjustment for what is called "drag" during t he butt fusion procedures. "Drag" is that amount of hydraulic pressure required to instigate movement of the movable carriage 49 and its attached pipe. Drag is a function of weight and/or length of the second pipe which is clamped within the movable carriage. To obtain drag, the directional control valve shifts to cause the movable carriage to leave its home position. The hydraulic pressure ramps over an increment of time until the linear transducer 90-92 senses movement. At that point the hydraulic pressure becomes the drag pressure. This amount of pressure or "drag" is automatically sensed by the computer and added to the required facing, heating, and fusing hydraulic pressures.

The heater described herein includes solid state temperature control and temperature sensor means with appropriate feedback to the computer and control system. The heater is in effect two parallel side-by-side heaters—one for each pipe end. The heater temperatures can be read upon the LCD display and recorded in the printout. The alarm, both by visual and audible means, is provided in the event the heater temperature is inappropriate for use with the current pipe type.

Time controls are provided in the apparatus and the process for the heating, soaking and heat fusion modes in addition to the cooling time, and such information is also recorded on the printout.

The apparatus also has incorporated means to advise of any slippage of the pipe ends from their clamps and/or carriages.

Other features involved in the apparatus may include LCD readable time clock and date and the fixed program butt fusion parameters and sidewall fusion parameters. The computer is also capable of automatically making adjustments for the heating and cooling times based upon the ambient temperature at the location where the fusion operation takes place, especially in extreme heat or cold conditions.

FIG. 5 provides detailed sequence of operation for a butt fusion process which occurs by a combination of manual operations and automatic operations which result from the program parameters placed into the microprocessor/computer-controller system. Manually the operator will enter into the computer, when asked on the display screen, his employee number, the job number, and the joint number. He will then enter the pipe size, the SDR or wall thickness, and the pipe type and/or manufacturer. The LCD screen will then show the fusion parameters relative to the particular pipe, and the program sets the values for automatic sequences of the operation. Once the calibration sequence is completed, the pipe is loaded into the unit, both the first pipe within the fixed jaws and the second pipe to be added in the movable carriage. The jaws are closed and the carriage moved to its home position. The double sided facing cutter 88 is then positioned on the guide rods 42 and 44 in the pretreatment zone 60 and the facing sequence will begin. The program parameters will allow the programmable digital computer to automatically set the facing pressure including an adjustment for drag. The operator will push the "face" button and a display will ask or remind the operator to insert the facer 88. The photoelectric system 94 and 96 will indicate whether the facer is in position; and if so, the facer motor will be started automatically. If the facer motor does not turn on, the display will ask the operator to turn on the motor as a reminder and the movable carriage will then start at a hydraulic pressure of 25 psi and ramp or increase until movement is indicated which becomes the drag which is added to the set facing psi. Movement is indicated by the linear transducer system 90-92. The carriage then moves the pipe into the facer 88 until stopped by the abutment of the carriage, and the fixed clamp against stops which are built into the facer. After a time delay, the facer is turned off and the carriage is returned to its home position. The operator then removes the facer, reviews the joint area, cleaning chips and other debris as needed. He will then push the interface check button, and the carriage will close, abutting the two pipe ends first under a low pressure to allow the operator to check for proper alignment and 'face-off' of the pipe ends. Any necessary adjustment are made at this time. If it is not adequately squared, the operator must repeat the sequence and begin again as it is important that the facing of the pipe ends be absolutely exact so that upon heating and subsequent fusion the pipe ends will be coaxially aligned. This may involve alignment and adjustment of the clamps holding the pipe. The computer display will ask the operator if the face-off is O.K., in which he will reply with a "Yes" or "No". If "No", the display then will ask the operator to reface the pipe ends. If "Yes", the carriage will return to the home position and stop. The program will add the drag psi previously determined to the theoretical fusion pressure to obtain actual system pressure required for fusion. These pressures are sensed and recorded by the digital computer which will then automatically control the carriage 49 to close at this pressure. The operator will push the "check" button on the control panel a second time, and the carriage will close. The carriage is held for a moment at this pressure; and if the linear transducer system 90, 92 shows no movement from any slippage, the movable carriage 50 is now programmed to return to its home position. If there has been any slippage, the alarm will advise the operator to return and repeat the face-off cycle.

The next step in the operation will be the heating of the pipe ends. The program parameters monitor the heater temperature via the temperature sensors 81 and the electrical connection 82 as shown in FIG. 3. The double sided heater surface must be within certain high/low limits in order to provide an adequate melt of the pipe ends to further provide an effective fused joint. There are both visual and audible alarms that will indicate any deviation from the programmed temperatures. The temperature is automatically adjusted based upon the manufacturer's pipe type. The operator will then manually install the heater assembly 80 upon the guide rods 40 and 42 with the heating surface coaxially positioned transverse to the longitudinal axis of the apparatus. The operator then pushes the "fuse" button and the automatic sequence begins. The carriage will close with the pipe ends making coaxial contact with the heater at the preprogrammed pressure and at a programmed time for the soak cycle. If additional soak time is needed, the operator can increase the time manually. Thereafter, the movable carriage 50 retracts after the programmed heat soak cycle time, and the heater is removed. Subsequently, the carriage now moves the molten end of the second pipe into contact with the molten end of the first fixed pipe at the preprogrammed fusion pressure. This pressure is maintained for the preprogrammed cooling time with constant monitoring of the pressure and for any slippage of pipe relative to the clamps holding same. The preprogrammed computer may automatically compensate for the ambient temperature and thus provides the amount of cooling time for the now-fused joint to set up. There is a manual override to permit increased time under extreme ambient conditions. Both the audible and visual indicators will be given to the operator when the cooling time is up and the operation will then move to the next joint of pipe.

Sidewall fusion of various fittings occurs in a very similar manner to the aforesaid operation for butt fusion except that the pipe to which the sidewall fitting is to be attached will be clamped within the fixed clamps 38 and 40, transverse to the longitudinal axis 20. The fitting will be attached to the movable carriage clamps and forced in a right-hand direction (referring to FIGS. 1 and 2) toward the fixed pipe. The operator will select "sidewall" either upon the function selector or from a menu display, and the display will ask for the fitting type, main pipe size, and pipe type. Again, the LCD readout will show heating and fusion parameters from that information which is now programmed into the computer. The operator will manually close the carriage and insert a heater assembly between the pipe and the sidewall fitting, and the process will continue similar to that in the butt fusion methods above described.

What is claimed is:

1. Apparatus for pre-treating and heat fuse joining plastic pipe with a digital computer-controller using an apparatus having:
   a frame means to define a longitudinal axis:
   fixed pipe clamp means on said frame to retain a pre-treated end of a first pipe with its axis parallel to said longitudinal axis;
   at least one pipe carriage means axially spaced from said pretreated end of said first pipe to retain a pretreated end of a second pipe co-axial with said first pipe;
   said carriage means movably supported upon guide rods, said rods fixed to said frame means on each side of said pipe, the axis of which lie in an imaginary plane which intersects said longitudinal axis;
   pipe end pretreatment means removably received on said guide rods comprising a pipe end facing cutter and a pipe end heater means, said pretreatment means being separately positionable transverse to said longitudinal axis between said first and second pipe ends;
   a transducer means on said frame for indicating the relative position of said pipe carriage to said fixed pipe clamp;
   hydraulic pressure means to axially move said pipe carriage means toward said fixed clamp means;
   said digital computer being programmable to receive input data as to said pipe, its type, its size, and wall thickness to form programmed parameters for fusing said pipe;
   said computer on communication with a controller that is sequentially responsive to said programmed parameters; said controller having thermostatic control means to actuate and maintain said pipe end heater means to a minimal temperature or temperature range, and having means based on said memory to sequentially actuate said hydraulic pressure means and reciprocate said carriage and said second pipe under a computed hydraulic pressure and for a computed amount of time to:
   (1) Communicate said first and second pipe ends with said pipe end facing means to create substantially parallel pipe ends which are transverse to said longitudinal axis;
   (2) Communicate the first and second pipe ends together at a low hydraulic pressure to check pipe alignment, the pipe end flatness;
   (3) Communicate the first and second pipe ends at a higher hydraulic pressure to check for any slippage of the pipe in the clamps;
   (4) Communicate said first and second pipe ends with said pipe and heater means to form molten pipe ends; and
   (5) Communicate said molten first and second pipe ends together until fused.

2. Apparatus of claim 1 including means for said digital computer to receive input data as to ambient temperature.

3. Apparatus pipe as set forth in claim 1, including;
   said computer controller includes a fail safe interlock in the event
   (a) said heater means is not within a minimal/maximum temperature range, or
   (b) said time between the formation of said molten pipe ends and said communication of said molten pipe ends will not permit acceptable fusion, or
   (c) of any slippage or axial movement of said pipe ends in said fixed pipe clamp or in said carriage.

4. Apparatus of claim 1 including means in a computer memory to store and provide printout data of each fusion join cycle of operation.

5. Apparatus of claim 4 wherein said data includes recommended and actual of said programmed parameters.

6. An apparatus for preparing plastic pipe ends for heat fusion comprising:
   (a) fixed means for retaining a first pipe end;
   (b) carriage means for retaining a second pipe end to be fused with said first pipe end;
   said carriage means being coaxially movable by hydraulic pressure relative to said fixed means to pre-treat, pre-heat, and fuse said pipe ends;
   (c) means to pretreat and pre-heat said first and second pipe ends at a point of their fusion; and
   (d) a programmable computer/controller system for controlling the operation of said carriage means, said programmable computer/controller system comprises:
   a central processing unit (CPU) for receiving initial pipe specification data;
   operating system software capable of computing pipe fusion parameters from said data;
   a program memory storage means for receiving said parameters;
   a circuit means for operatively connecting input/output devices and said CPU with said carriage means wherein said input/output devices include:
   means to monitor relative position of said carriage to said fixed means;
   means to monitor said hydraulic pressure;
   means to monitor a locus of said means to pretreat and pre-heat said first and second pipe ends;
   a control panel for pre-setting said CPU to operate in both manual and automatic modes;
   a display means on said control panel for visually transmitting said data, information and procedural instructions; and
   a printout means for recording said pipe specification data and other pipe fusion parameters.

7. The apparatus of claim 6 wherein said CPU includes means to receive ambient temperature.

8. The apparatus of claim 6 including means to compute hydraulic drag pressure of said carriage means.

9. The apparatus of claim 6 including visual and/or audible alarm means for any inappropriate function of said fusion parameters.

10. The apparatus of claim 6 wherein said fusion parameters include
    means to monitor said carriage position relative to said fixed means;
    means to control said hydraulic pressure;
    means to control time said carriage is in a position to pre-treat, and for fusing said first and second pipes.

11. The apparatus of claim 6 wherein said specification data includes said pipe type, size, and wall thickness.

12. A process of joining plastic pipe by heat fusion using an apparatus that includes:
    (a) fixed means retaining a first pipe and in a treatment zone;
    (b) carriage means retaining a second pipe end in said treatment zone to be co-axially fused with said first pipe end, said carriage means being reciprocatively movable, by hydraulic pressure, toward and from said treatment zone;
    (c) means positionable in said treatment zone to removably receive a pipe end facing cutter and a pipe end heater means; and
    (d) a digital computer;
    the process comprising the steps of:
    providing said computer with a database capable of converting input data as to the characteristics of said pipe into programmed parameters for acceptable heat fusion of said first and second pipe ends;
    controlling said hydraulic pressure and hence the movement of said carriage and the time therefor, based on said parameters during cycles wherein said pipe end facing cutter and said pipe end heater are positioned in said treatment zone, and during said heat fusion and cooling of said fused joint, the movement of said carriage and said second pipe end includes the steps controlled by said programmed parameters of:
    moving said carriage at a first hydraulic pressure to determine pipe drag pressure and to cause said first and second pipe ends to communicate with said facing cutter until said moving is limited by a stop means, then retracting said carriage, and removing said facing cutter;
    moving said carriage at a second hydraulic pressure, to determine alignment of said first and second pipe ends;
    moving said carriage at a third hydraulic pressure that is higher than said first or second hydraulic pressure to cause abutment of said first and second pipe ends for a computer time to determine if any slippage, then retracting said carriage;
    moving said carriage at a fourth hydraulic pressure, which is between said first and said third hydraulic pressures, to communicate said pipe ends with said pipe end heater means for a computed time, then retracting said carriage, and removing said heater means; and
    moving said carriage at least said third hydraulic pressure to communicate and fuse said first and second pipe ends for a computed time.

13. A process of joining plastic pipe by heat fusion using an apparatus that includes:
    (a) fixed means retaining a first pipe end in a treatment zone;
    (b) carriage means retaining a second pipe end in said treatment zone to be co-axially fused with said first pipe end, said carriage means being reciprocatively movable, by hydraulic pressure, toward and from said treatment zone;
    (c) means positionable in said treatment zone to removably receive a pipe end facing cutter and a pipe end heater means, said facing cutter having stop means to limit movement of said carriage; and
    (d) a digital computer;
    the process comprising the steps of:
    providing said computer with a database capable of converting input data as to the characteristics of said pipe into programmed parameters for acceptable heat fusion of said first and second pipe ends;
    controlling said hydraulic pressure and hence the movement of said carriage and the time therefor, based on said parameters during cycles wherein said pipe end facing cutter and said pipe end heater are positioned in said treatment zone, and during said heat fusion and cooling of said fused joint, the movement of said carriage and said second pipe end includes the steps controlled by said programmed parameters of:

moving said carriage at a first increasing hydraulic pressure to cause said first and second pipe ends to communicate with said facing cutter until said carriage movement is limited by said stop means;

sensing, by a linear transducer, the continuous movement of said carriage over a given distance of said carriage is moved at said first increasing hydraulic pressure and providing a signal representing said continuous movement;

determining hydraulic drag pressure of said carriage by communicating said signal with a hydraulic pressure transducer;

communicating said determined hydraulic drag pressure to said digital computer;

retracting said carriage, and removing said facing cutter;

moving said carriage at a second hydraulic pressure, which includes said drag pressure, to determine alignment of said first and second pipe ends;

moving said carriage at a third hydraulic pressure, which includes said drag pressure, that is higher than said first or second hydraulic pressure to cause abutment of said first and second pipe ends for a computer time to determine if there is any slippage of said pipe in said fixed means and/or said carriage means, then retracting said carriage;

moving said carriage at a fourth hydraulic pressure, which includes said drag pressure, which is between said first and said third hydraulic pressures, to communicate said pipe ends with said pipe end heater means for a computed time, then retracting said carriage, and removing said heater means; and moving said carriage at at least said third hydraulic pressure to communicate and fuse said first and second pipe ends for a computed time.

14. The process of claim 13 wherein the movement of said carriage at a fourth hydraulic pressure occurs for a given movement of said carriage as sensed by said transducer, then reducing said fourth hydraulic pressure to a pressure at least equal to said drag pressure.

15. An apparatus for preparing plastic pipe ends for heat fusion comprising:
(a) fixed means for retaining a first pipe end;
(b) carriage means for retaining a second pipe end to be fused with said first pipe end, said carriage means being coaxially movable by hydraulic pressure relative to said fixed means to pre-treat, pre-heat, and fuse said pipe ends;
(c) means to pretreat and pre-heat said first and second pipe ends at a point of their fusion; and
(d) transducer means for detecting continuous movement of said carriage means and provide a signal therefrom as a function of said continuous movement of said carriage over an initial distance of movement to determine hydraulic drag pressure of said carriage, and to determine the location of said carriage means and said pipe ends during said pretreat, pre-heat, and fusion of said pipe ends; and
(e) a programmable computer/controller system for receiving at least initial pipe specification data, signals from said transducer, and hydraulic pressure for controlling the operation of said carriage means.

* * * * *

UNITED STATES PATENT AND TRADEMARK OFFICE
CERTIFICATE OF CORRECTION

PATENT NO. : 5,013,376

DATED : May 7, 1991

INVENTOR(S) : Arthur H. McElroy II, Jim M. Craig, David W. Porter, Gene R. Randall Jr., Allan W. Wolff It is certified that error appears in the above-indentified patent and that said Letters Patent is hereby corrected as shown below:

On the title page:

Insert at (75) omitted inventors --David W. Porter, Broken Arrow, Oklahoma; Gene R. Randall Jr., Bixby, Oklahoma; Allan W. Wolff, Broken Arrow, Oklahoma--.

Column 2, line 24, change "sYstem" to --system--.

Signed and Sealed this

Thirteenth Day of July, 1993

Attest:

MICHAEL K. KIRK

Attesting Officer     Acting Commissioner of Patents and Trademarks